(12) United States Patent
Gibson et al.

(10) Patent No.: US 11,001,289 B2
(45) Date of Patent: May 11, 2021

(54) STROLLER CONVERTIBLE FOR MULTIPLE MODES OF USE

(71) Applicant: Evenflo Company, Inc., Miamisburg, OH (US)

(72) Inventors: Bryce Gibson, Dedham, MA (US); Michelle M. J. Wood, Rehoboth, MA (US); Raymond Boissonneault, Upton, MA (US)

(73) Assignee: Evenflo Company, Inc., Miamisburg, OH (US)

(*) Notice: Subject to any disclaimer, the term of this patent is extended or adjusted under 35 U.S.C. 154(b) by 23 days.

(21) Appl. No.: 16/738,224

(22) Filed: Jan. 9, 2020

(65) Prior Publication Data

US 2020/0247453 A1    Aug. 6, 2020

Related U.S. Application Data

(60) Provisional application No. 62/790,573, filed on Jan. 10, 2019.

(51) Int. Cl.
*B62B 7/06* (2006.01)
*B62B 3/02* (2006.01)
*B62B 9/20* (2006.01)

(52) U.S. Cl.
CPC ............... *B62B 7/06* (2013.01); *B62B 3/022* (2013.01); *B62B 9/20* (2013.01)

(58) Field of Classification Search
CPC .. B62B 7/06; B62B 3/022; B62B 9/20; B62B 9/203
See application file for complete search history.

(56) References Cited

U.S. PATENT DOCUMENTS

| | | | | |
|---|---|---|---|---|
| 4,681,331 A | * | 7/1987 | Glaser | B62B 7/08 280/47.36 |
| 4,733,882 A | * | 3/1988 | Kassai | B62B 7/08 280/655.1 |
| 4,805,928 A | * | 2/1989 | Nakao | B62B 7/08 280/47.4 |
| 4,846,494 A | * | 7/1989 | Kassai | B62B 7/08 280/642 |
| 5,133,567 A | | 7/1992 | Owens | |
| 5,538,267 A | | 7/1996 | Pasin et al. | |
| D378,997 S | | 4/1997 | Marozza et al. | |
| D379,165 S | | 5/1997 | Marozza et al. | |
| 5,833,251 A | | 11/1998 | Peck | |
| 7,694,995 B2 | | 4/2010 | Dotsey et al. | |
| 9,108,656 B1 | | 8/2015 | Nolan et al. | |
| 9,242,663 B1 | | 1/2016 | Nolan et al. | |
| 9,308,839 B1 | | 4/2016 | Gleckler | |
| 9,327,749 B2 | * | 5/2016 | Young | B62B 5/08 |
| 9,333,977 B2 | | 5/2016 | Herlitz et al. | |

(Continued)

OTHER PUBLICATIONS

International Patent Application No. PCT/US2020/012853; Int'l Search Report and the Written Opinion; dated Mar. 31, 2020; 17 pages.

*Primary Examiner* — Erez Gurari
(74) *Attorney, Agent, or Firm* — BakerHostetler

(57) ABSTRACT

Disclosed herein are strollers capable of use in multiple configurations. More particularly, the present disclosure relates to strollers that may be converted and/or configured for multiple uses including a pivotable handle movable for use between a high push configuration and a low pull configuration.

20 Claims, 14 Drawing Sheets

(56) References Cited

U.S. PATENT DOCUMENTS

| | | | |
|---|---|---|---|
| 9,358,445 B1 | 6/2016 | Nolan et al. | |
| 9,469,324 B2 * | 10/2016 | Bowman | B62B 3/007 |
| D794,133 S | 8/2017 | Ostergaard et al. | |
| 10,077,062 B2 * | 9/2018 | Bowman | B62B 5/082 |
| 10,507,857 B2 * | 12/2019 | Bowman | B62B 3/02 |
| 2002/0121753 A1 * | 9/2002 | Suzuki | B62B 7/08 |
| | | | 280/47.36 |
| 2003/0160432 A1 | 8/2003 | Sack et al. | |
| 2007/0085304 A1 * | 4/2007 | Yeh | B62B 9/087 |
| | | | 280/642 |
| 2010/0109271 A1 * | 5/2010 | Funakura | B62B 7/08 |
| | | | 280/47.36 |
| 2011/0248479 A1 * | 10/2011 | Chen | B62B 9/203 |
| | | | 280/658 |
| 2012/0267877 A1 | 10/2012 | Mazar et al. | |
| 2013/0264787 A1 | 10/2013 | Cheng et al. | |
| 2020/0247453 A1 * | 8/2020 | Gibson | B62B 9/14 |
| 2021/0022314 A1 * | 1/2021 | Xiang | B62B 9/12 |

* cited by examiner

STROLLER CONVERTIBLE FOR MULTIPLE MODES OF USE

CROSS REFERENCED APPLICATION

This application claims priority to U.S. Provisional application No. 62/790,573 filed Jan. 10, 2019, the entire disclosure of which is incorporated herein in its entirety.

TECHNICAL FIELD

The present disclosure relates to strollers. More particularly, the present disclosure relates to a stroller that may be converted and/or configured for multiple uses including a pivotable handle movable for use between a high push configuration and a low pull configuration.

BACKGROUND

Strollers designed to be used in multiple configurations and/or convertible to multiple modes of use are known in the art. For example, U.S. Pat. No. 5,538,267 to Pasin et al. discloses a convertible wagon convertible from a wagon configuration to a stroller configuration. More specifically, the '267 patent discloses a wagon utilizing a handle which can be pivotably attached to a latch assembly on the front of the wagon body allowing the wagon to be pulled as well as detachable and attached in a separate upright position to a locking assembly positioned on the back wall of the wagon allowing it to be pushed. U.S. Pat. No. 5,133,567 to Owens discloses a stroller that is convertible between a stroller, carrier and car seat by use of a stroller handle assembly pivotally attached to the carrier body that can be locked in an upright position by means of stroller handle locking means for use of the apparatus as a stroller and locked in a folded position for use of the apparatus as an infant carrier or car seat.

U.S. Pat. No. 9,327,749 to Young et al. discloses a foldable wagon having a collapsible frame that converts the wagon from a use configuration to a folded configuration for storage and transportation. The wagon disclosed in the '749 patent has a collapsible frame positonable in an open position and a collapsed position, a plurality of wheels coupled to the collapsible frame, a plurality of substantially rigid seats pivotally coupled to the collapsible frame, and a flexible housing about the collapsible frame to form a sidewall for the wagon. Additionally, U.S. Pat. No. 9,333,977 to Herlitz et al. discloses a multipurpose wagon that has seats that may be used in a wagon configuration as well as a stroller-like configuration. However, none of these prior art patents disclose a stroller convertible for multiple modes of use that accomplishes the desired task of easily and efficiently allowing the stroller to be converted to multiple modes of operation as desired.

More specifically, it would be desirable to provide a stroller that is selectively configurable between a wagon configuration, a stroller configuration for use by an infant, and a stroller configuration useable by a toddler. In a stroller configuration, it would be preferable if the handle was usable in a high push configuration. In a wagon configuration, it would be preferable if the handle was usable in a low pull configuration. In particular, it would also be desirable if the stroller had options for storage including the ability to add additional storage areas if necessary. It would also be desirable if the selective configuration of the stroller could be accomplished without the need for any special tools or any add-on components, as purchasing and storing such tools or components can be both costly and burdensome.

SUMMARY

Disclosed herein are strollers, which may be comprised of a frame and connector components adapted to support one or more seats. The strollers disclosed herein may be convertible from use in a wagon configuration, to use in an infant stroller configuration, to use in a toddler configuration. Preferably, the stroller of the present disclosure has a handle that may be used to pull the stroller in a wagon configuration and push the stroller in a stroller configuration.

In accordance with aspects of the disclosure, a stroller having an auxiliary storage component that allows for additional storage capacity in one configuration and which may be easily and conveniently stowed when not in use is provided.

In accordance with aspects of the disclosure, the stroller of the present disclosure may be provided with connector components adapted to support an infant seat (such as an infant car seat component) when the stroller is in infant seat mode. In such an embodiment, the connector components may hold the seat in selectively releasable attachment therewith.

In accordance with aspects of the disclosure, a stroller is provided that may support a primary stroller seat structure as well as other components such as an auxiliary tray or a cradle support.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

DETAILED DESCRIPTION

Figure 1:
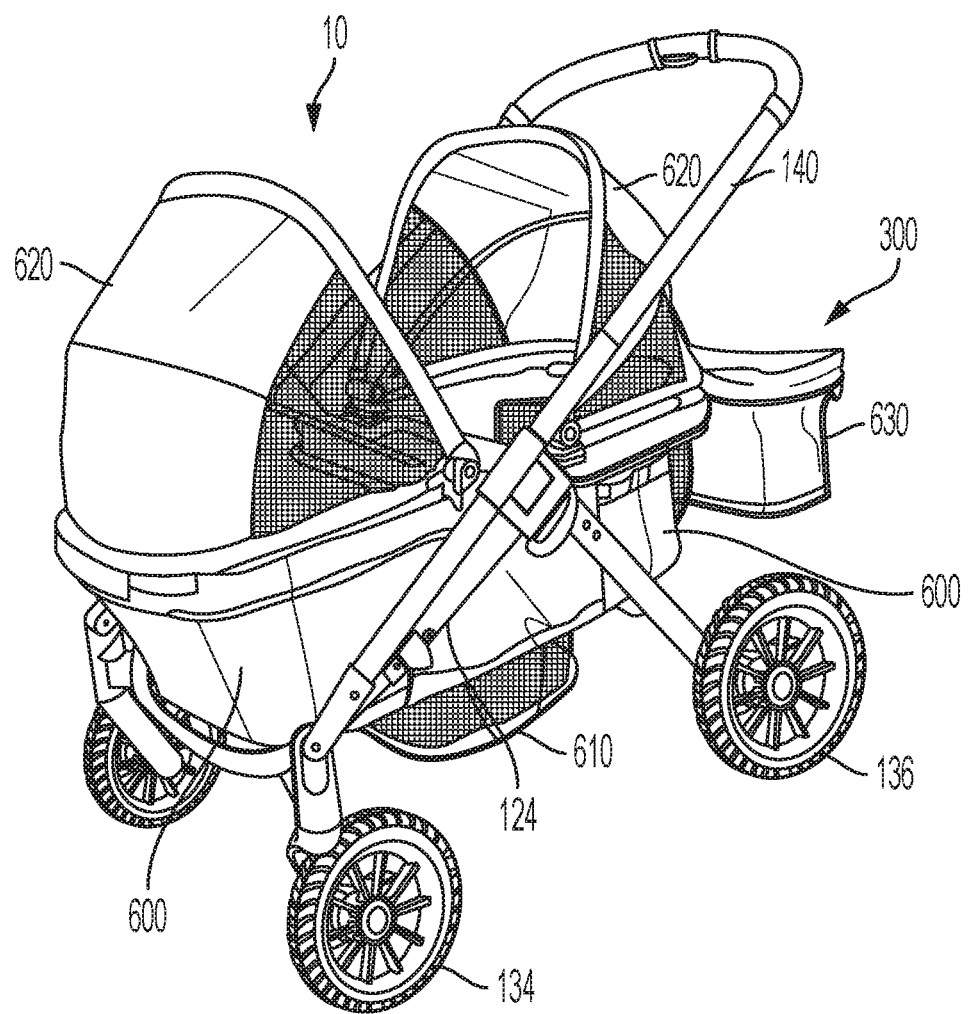
FIG. 1 is a front perspective view of a stroller in accordance with aspects of the present disclosure in a double-seat toddler configuration having a fold out foot well and a deployed auxiliary storage area.
Figure 2:
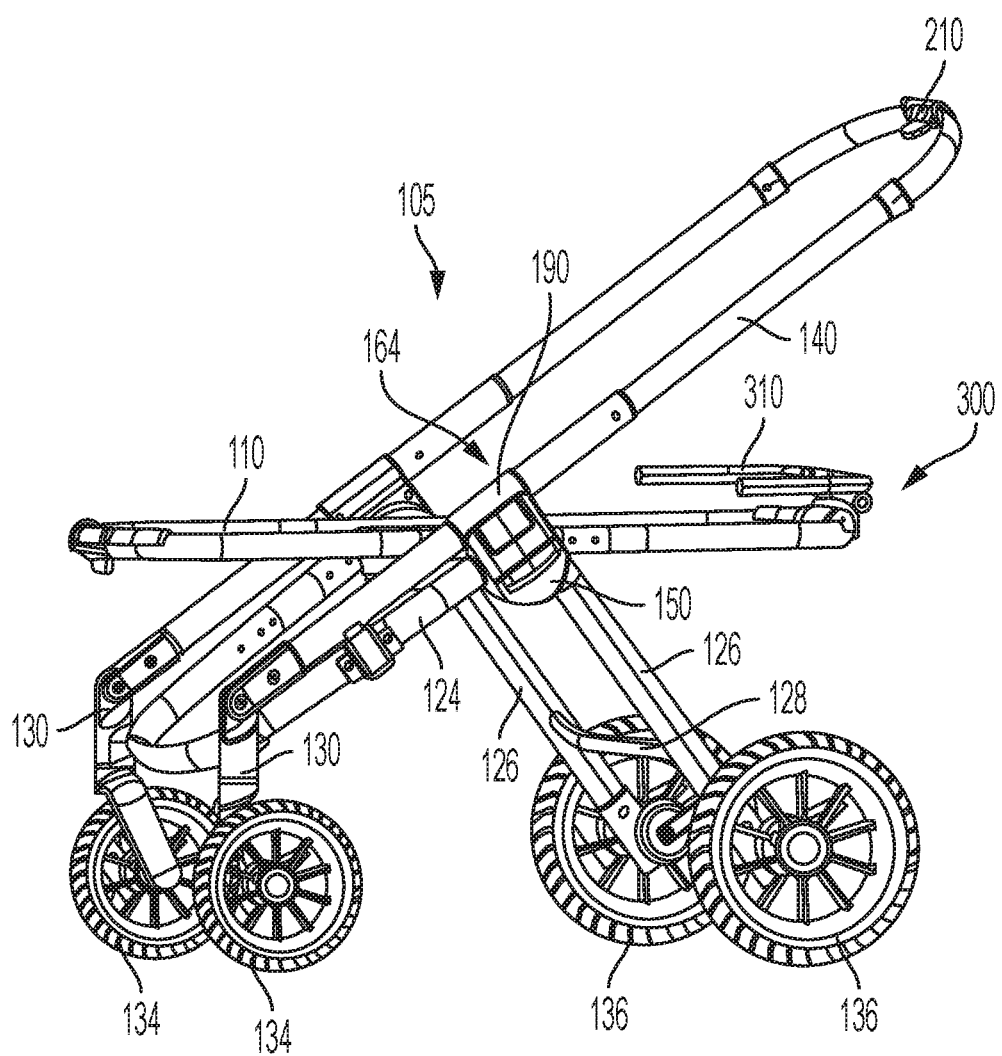
FIG. 2 is a front perspective view of the stroller of FIG. 1 showing the stroller frame only and the auxiliary storage area support in a stored configuration.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure.

In accordance with aspects of the disclosure, exemplary embodiments of strollers convertible for multiple modes of use illustrated in various levels of specificity in FIGS. 1-12. Very generally, stroller 10 is designed for safely transporting one or two infants, toddlers or children in various modes and configurations. In other modes of configuration, stroller 10 may be used and configured in wagon mode for carrying one or two toddlers or children, or simply for transporting goods.

As best shown in FIGS. 2-5, Stroller 10 may be defined by a frame 105, which may include an upper frame portion 110 and a V-shaped lower frame portion 120, comprised of a U-shaped front leg 124 and rear leg portions 126 that may include a support bar 128 there between (alternatively, rear leg portions 126 could be a single U-shaped tube as well and vice-versa). The front leg 124 may preferably have struts 130 attached to lower ends thereof for attaching pivotable front wheels 134 as is known in the art. Preferably, a pivot handle 140 is pivotably attached to a portion of the struts 130. Rear leg portions 126 may include wheels 136 thereon and the wheels 136 may have brakes 138 as is known in the art.

Figure 9:
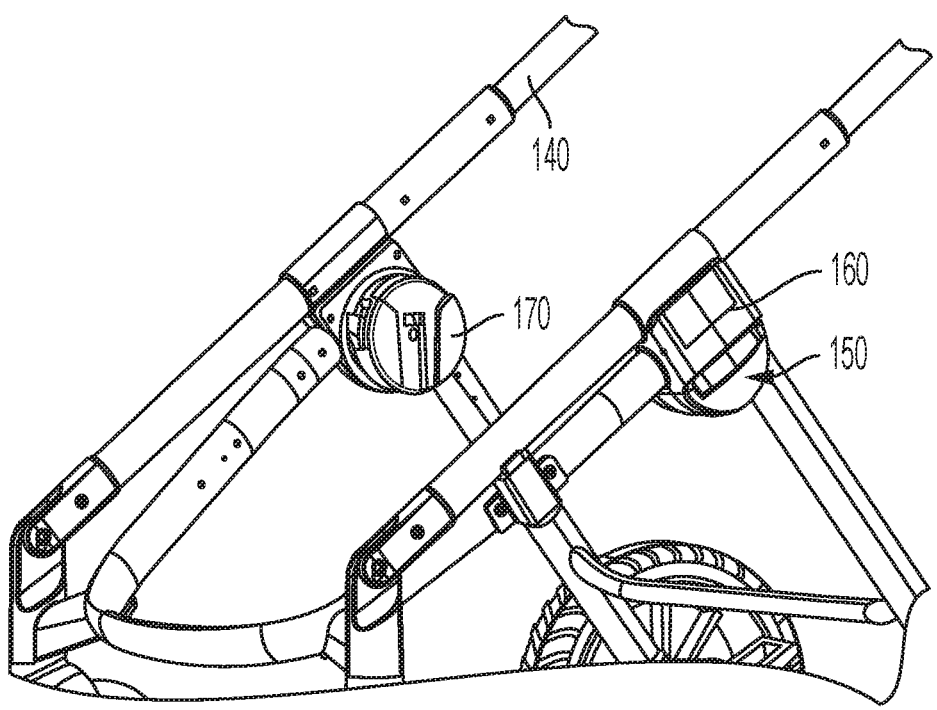
FIG. 9 is a detail perspective view of hub connectors of the stroller of FIG. 1.
Figure 10:
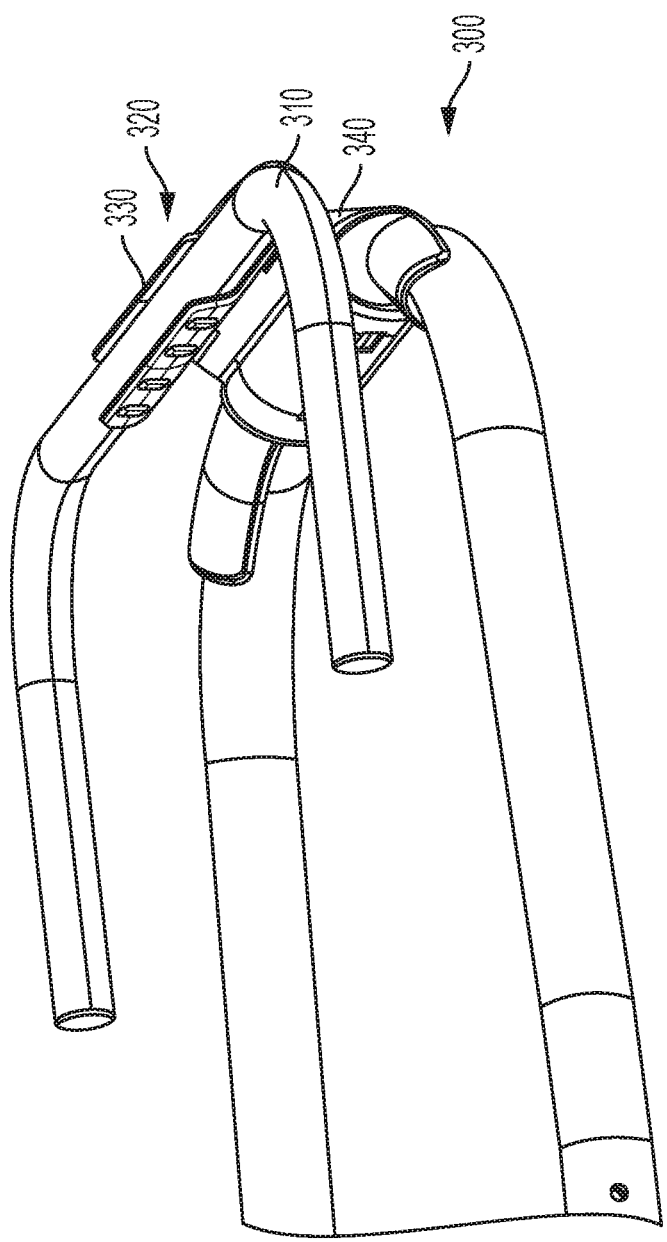
FIG. 10 is a detail perspective view of the frame components only of the auxiliary storage area support in a stored configuration.
Figure 11:
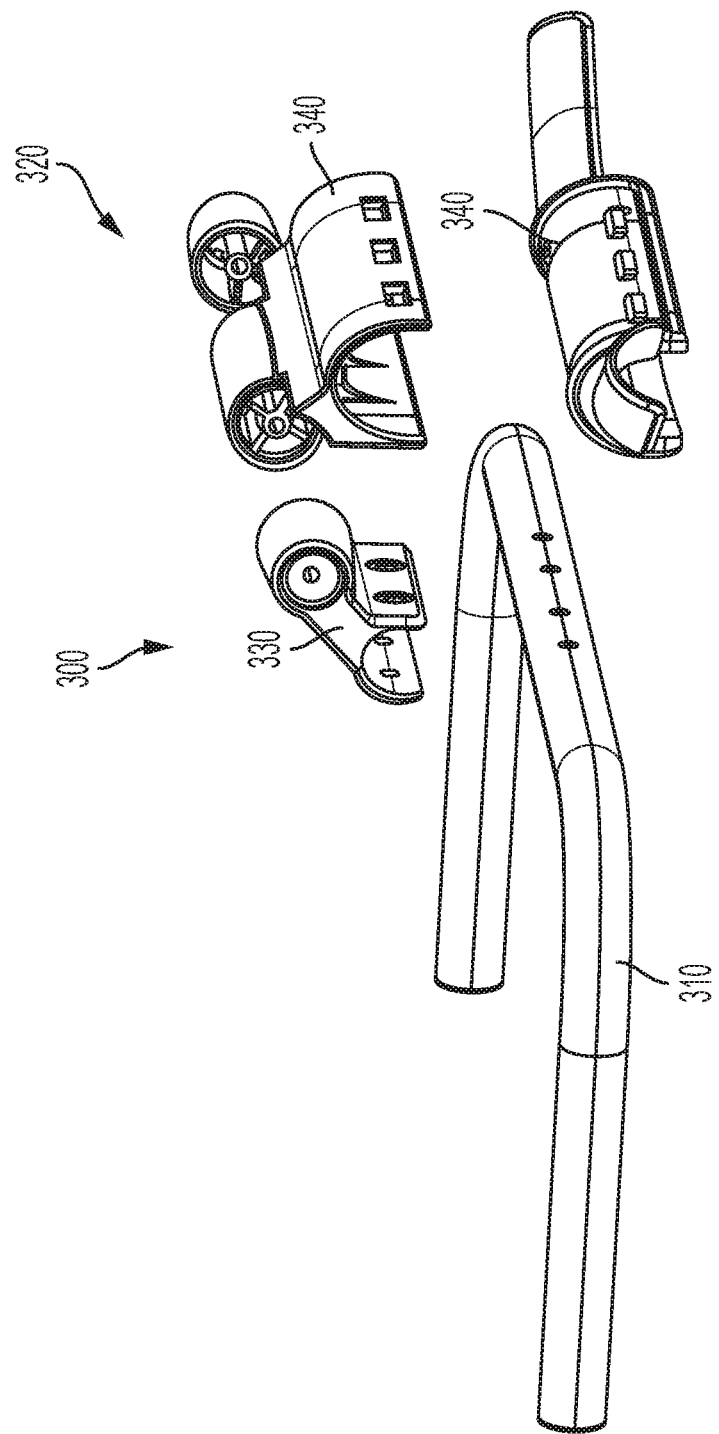
FIG. 11 is an exploded detail perspective view of the connector portions for the frame components of the auxiliary storage area support.
Figure 12:
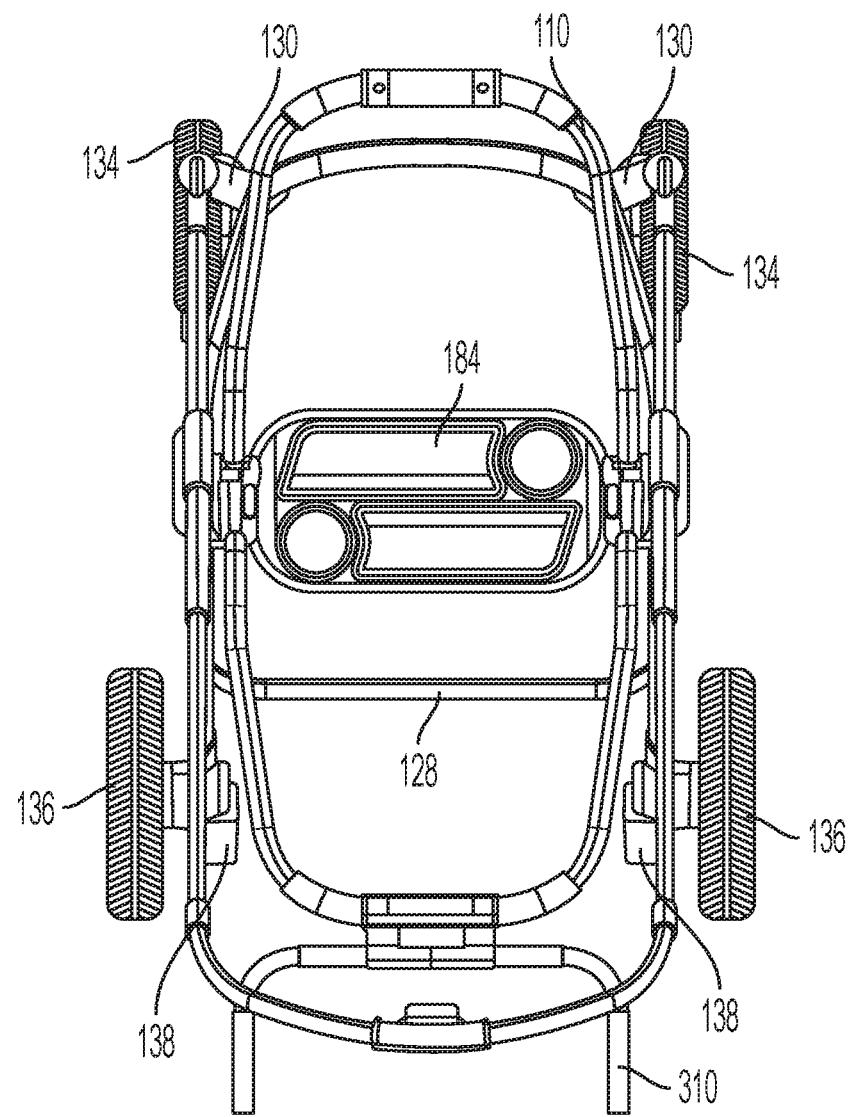
FIG. 12 is a top plan view of the frame components only of the stroller of FIG. 1 showing the auxiliary storage area frame in deployed configuration and a tray component releasably attached to the hub connectors.

Preferably two connector components 150 are positioned to connect the front leg 124 and the rear leg portions 126 to form the complete lower frame portion 120. The connector components 150 may include lock mechanisms 160 for releasably locking a medial section 164 of the pivot handle 140 thereto. As best shown in FIG. 9, the connector components 150 may also include hub portions 170 on the interior thereof adapted to releasably connect a seating structure 180 (or other components, such as a cradle component 500 (see FIG. 5) and/or an auxiliary tray 184 (see FIG. 12), et al.) thereto. More specifically, the hub portions 170 may be designed to cooperatively attach the seating structure 180 (or other components) to the stroller 10, while also permitting the seating structure 180 to be quickly and easily detached without the need for any special tools or time-consuming procedures as is known in the art.

The hub portions 170 may be of any suitable construction for selectively releasably attaching the seating structure 180 (or other components) to the stroller frame 105. For example, the seating structure 180 may include its own mating components 186, which may be shaped complementary to respective ones on the hub portions 170. Suitable mating components 186 include, but are not limited to, locking tabs, friction fittings, rotating latches, magnetic components, or the like.

As best shown in FIG. 1, the stroller frame 105 may be provided with various soft goods components as is known in the art. The soft goods components may optionally include a wagon portion 600 shaped to hang from the upper frame 110 to provide a wagon-like main storage area for the stroller 10. In a preferred embodiment, the wagon portion 600 may include an auxiliary footwell 610 that may be moved from a storage position to a deployed position through multiple known structures in the art (such as the use of Velcro catches (not shown)). Additionally, soft good canopies 620 that may be releasably attached to the frame 110 may be provided to provide shade to infant/child users as desired. The soft goods may also comprise an auxiliary storage compartment 630 shaped and sized to be supported by the support 310 and which may be removably attached thereto as is known in the art.

As discussed above, and as best shown in FIGS. 7 and 8, the connectors 150 may be provided with locking mechanisms 160 thereon to releasably lock medial portions 164 of pivot handle 140. In an exemplary embodiment, the medial portions 164 are collars 190 formed or fitted coaxially around the tubular pivot handle 140. The collars 190 preferably include at least one notch 194 thereon for receiving a hook finger 196 located on the upper portion of a pivoting interlock 200. The interlock 200 is preferably pivotally mounted on the locking mechanism 160 and is spring-biased into a closed, or locked, configuration (see FIG. 8). The interlock 200 preferably includes friction slots 202 on an upper portion of the hook finger 196 so that a user may pull outwardly thereon to overcome the spring bias allowing the hook finger 196 to disengage from the notch 194 to allow the pivot handle 140 to be released. Then, in a released condition the, pivot handle 140 may be pivoted forward so that a user may pull the stroller 10 in a wagon-like manner.

In an alternate embodiment, the interlock 200 may be connected to a release lever 210 located on an upper portion of the pivot handle 140 by a wire connected through the tubular pivot handle (not shown) as is known in the art. In such an embodiment, rotation of the release lever 210 by a user pulls the wire to overcome the spring bias on the interlock 200 (or interlocks, if two are utilized) allowing release of the pivot handle 140 from the lock mechanism 160. As above, the pivot handle 140 may then be pivoted forward so that a user may pull the stroller 10 in a wagon-like manner As shown best in FIGS. 10-11, the auxiliary storage structure 300 is illustrated. Preferably, the auxiliary storage structure 300 comprises a U-shaped support 310 pivotally connected to a back portion of the upper frame 110 portion of the stroller 10 by a connection assembly 320. The connection assembly 320 may be made of plastic or other suitable materials and may be comprised of a pivot mount 330 attached to the support 310 by screws or rivets (not shown) and which may be shaped to be pivotally received in pivot hinge mechanism 340 attached to the back portion of the upper frame 110 by being coaxially attached around the frame 110 tube or secured thereto (such as by screws or rivets (not shown) as is known in the art. Preferably, the pivot mount 330 is shaped and sized such that it is frictionally received in the pivot hinge mechanism 340 whereby it is generally biased against movement and only pivots in (to a storage position) and out (to a use position) by a user.

Figure 3:
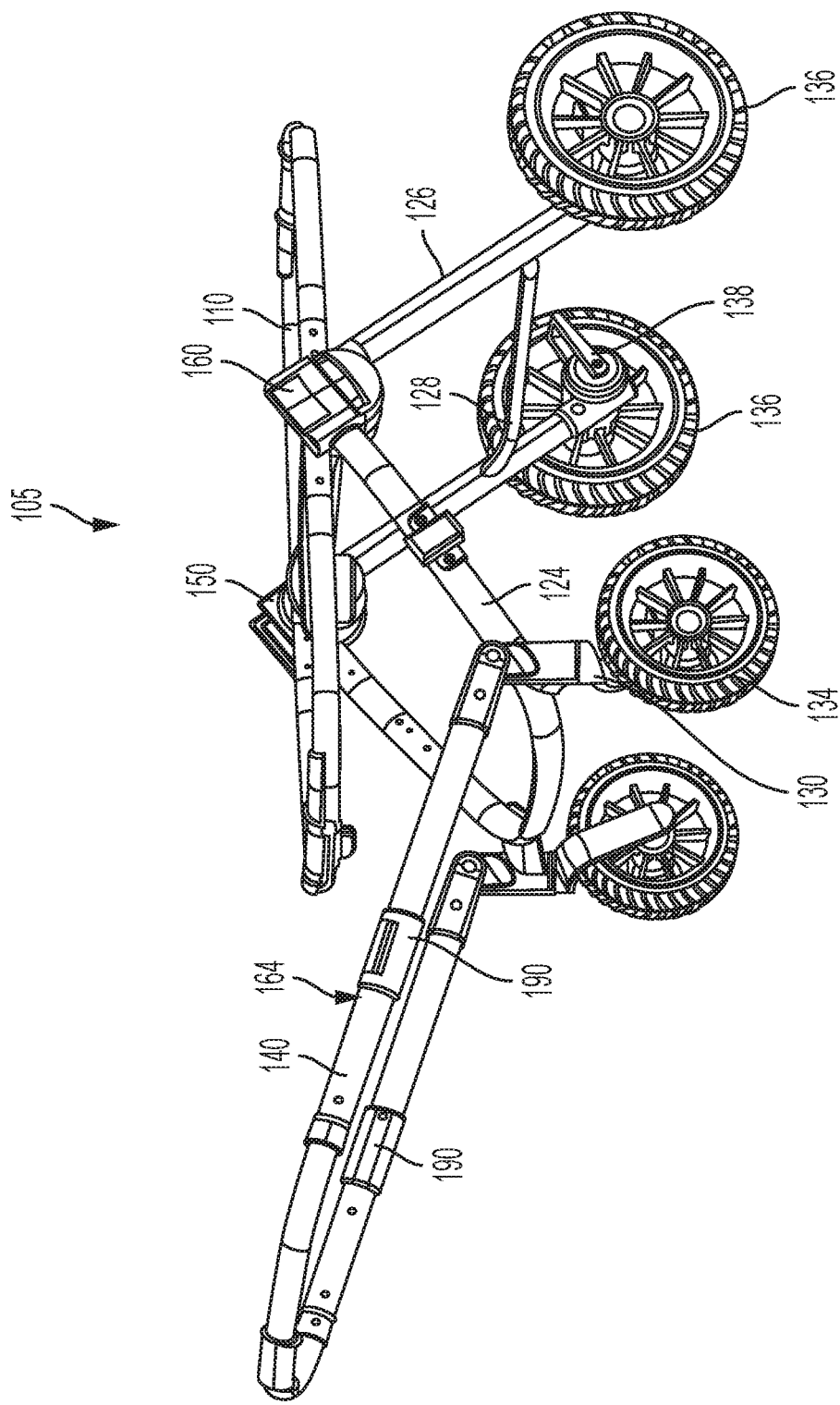
FIG. 3 is a front perspective view of the stroller of FIG. 1 showing the stroller frame only (without the auxiliary storage support) with the stroller handle in the wagon configuration.
Figure 4:
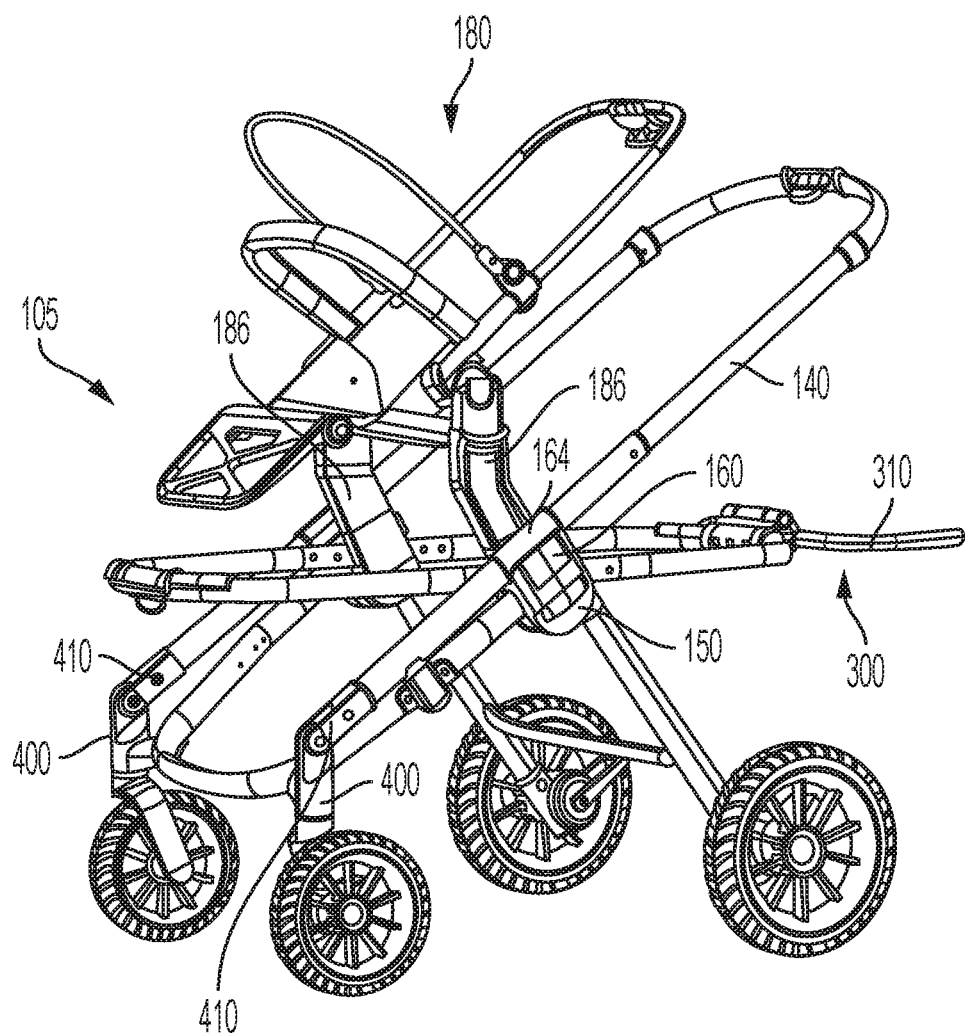
FIG. 4 is a front perspective view of the stroller of FIG. 1 showing the stroller frame only having a seat frame attachment attached thereto and the auxiliary storage area support in a deployed configuration.
Figure 6:
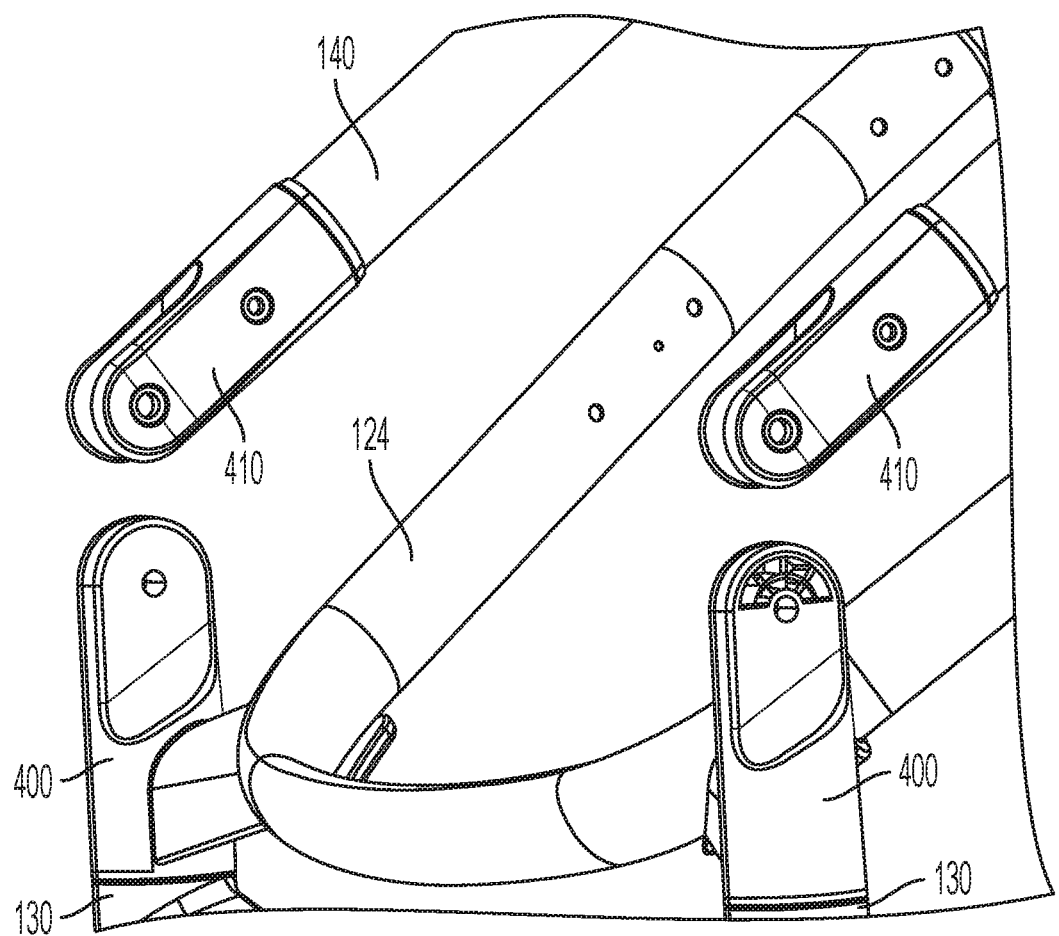
FIG. 6 is an exploded detail perspective view of the handle pivot of the stroller of FIG. 1.
Figure 7:
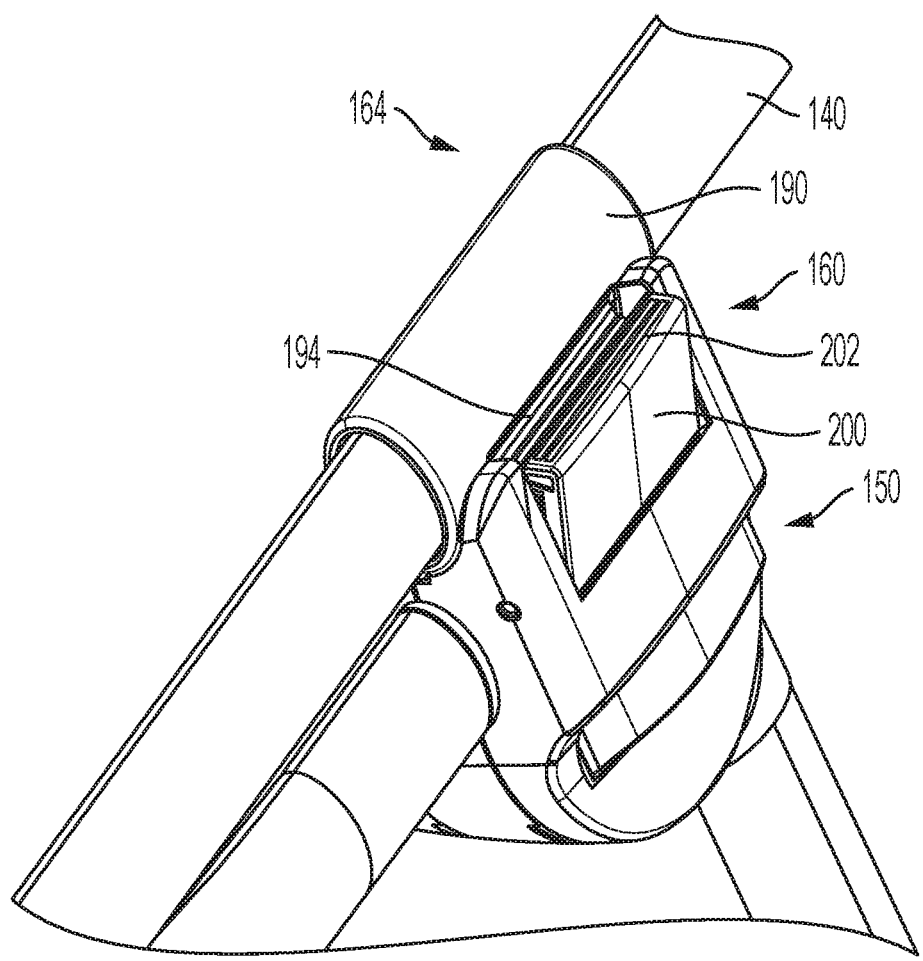
FIG. 7 is a detail perspective view of the stroller handle latch mechanism of the stroller of FIG. 1.
Figure 8:
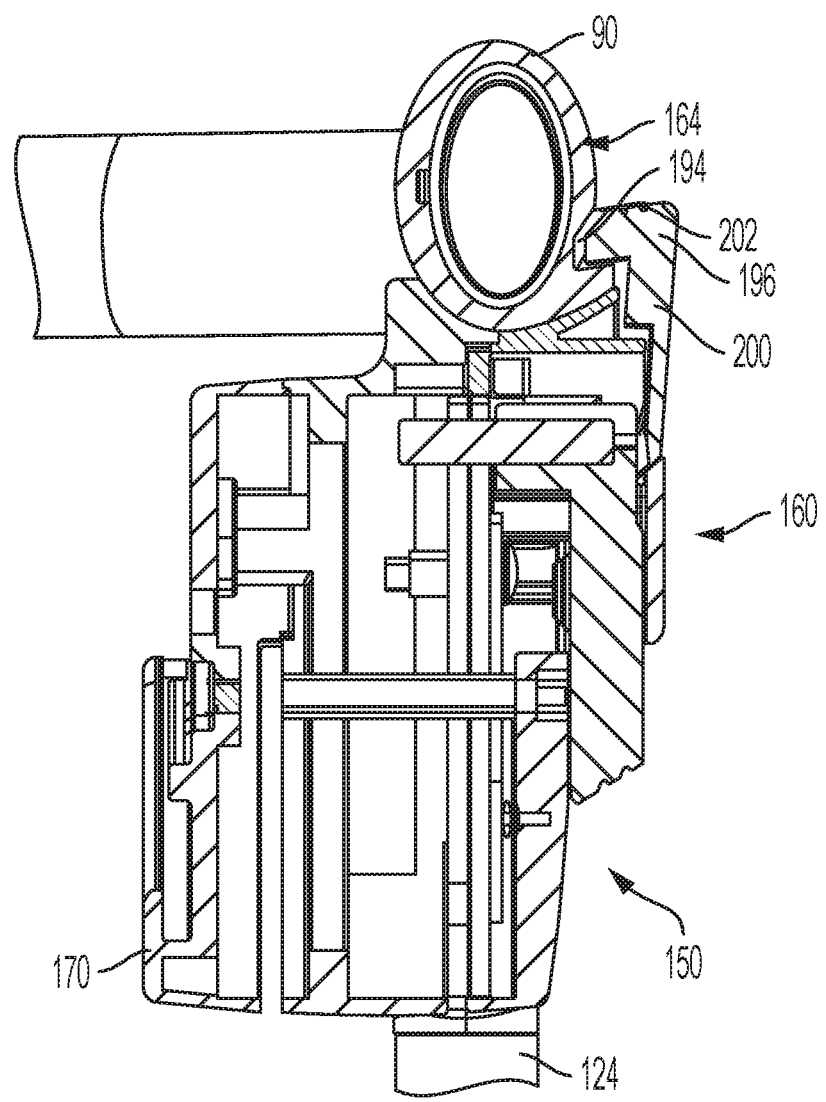
FIG. 8 is a cutaway front elevation view of the stroller handle latch mechanism of FIG. 7.

As best shown in FIGS. 3 and 6, the pivot handle 140 is preferably mounted to the struts 130 in a pivoting manner at a lower portion of the U-shaped front leg 124. As discussed above, mounting at this particular position combined with the support and locking of the medial portions 164 of the handle 140 by the locking mechanism 160 allows the handle 140 to be used both in a conventional stroller high push configuration and a lower conventional wagon-style pull configuration. In an exemplary embodiment, the pivot handle 140 may be pivotally mounted to the struts 130 using a known clevis-style pivot bracket. In such a configuration the top portions of the struts 130 may be fitted with finger portions 400 while the bottom portions of the pivot handle 140 may be fitted with corresponding bracket portions 410 for pivotally receiving the finger portions 400 therebetween by a pivot pin (not shown).

Figure 5:
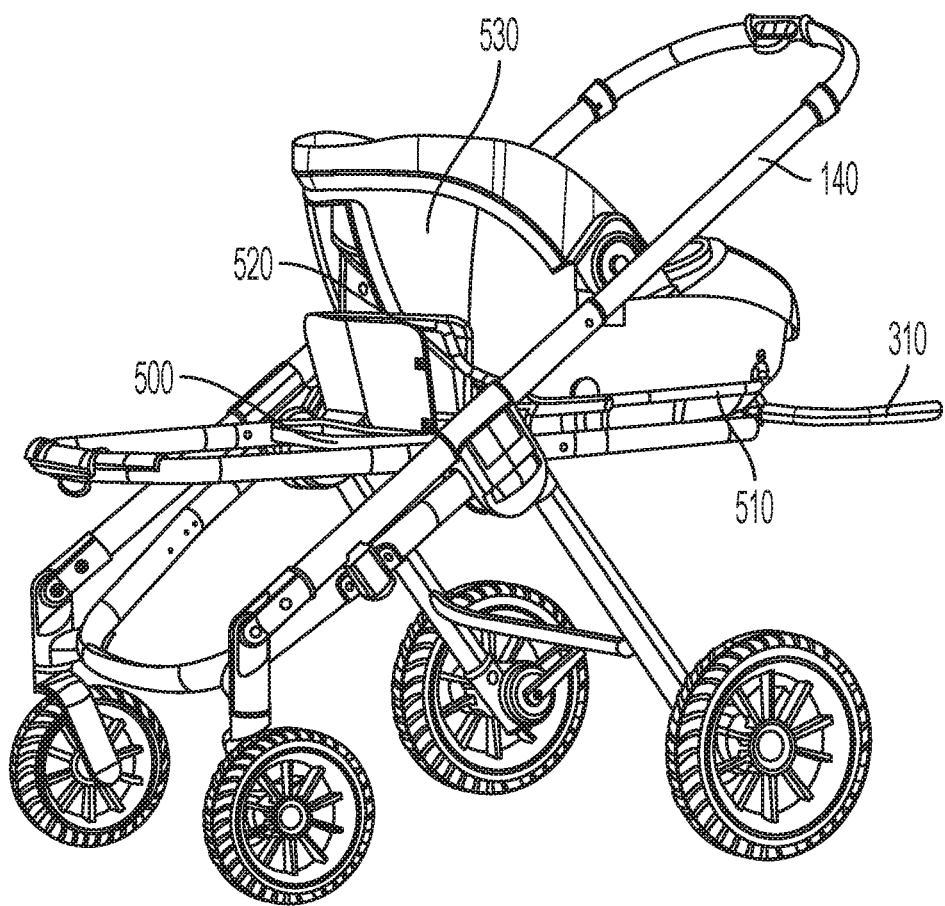
FIG. 5 is a front perspective view of the stroller of FIG. 1 showing the stroller frame only having an infant seat attached thereto and the auxiliary storage area support in a deployed configuration.

As best shown in FIG. 5, an additional configuration may include a cradle support 500 that is shaped to be releasably received in the hubs 170 and be supported by the upper frame 110. The cradle support 500 may include a support rail 510 having a back portion 520 shaped and sized to be releasably received by an infant car seat 530 as is known in the art.

Figure 13:
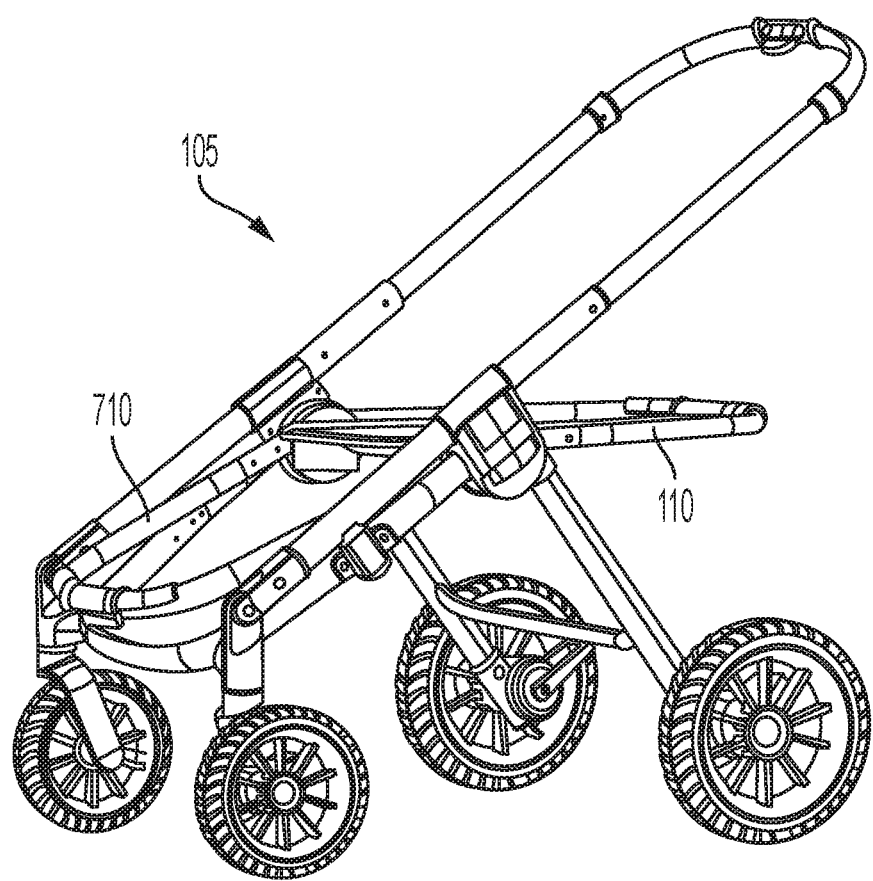
FIG. 13 is a side perspective view of the frame components only of the stroller of FIG. 1 showing the front tube in a lowered configuration.

As best shown in FIG. 13 an exemplary embodiment of the stroller 10 of the present disclosure may include an embodiment where the stroller frame 105 may include a front portion 710 of upper frame portion 110 capable of folding downward to provide easier access to portions of the stroller 10 (either for access to the wagon portion thereof or to allow easier access for a caregiver/child to the seating configuration). In such an embodiment, the front portion 710 of upper frame portion 110 may be pivotably attached to hub portions 170 as is known in the art. Specifically, the pivotable attachment may include an interlock button or latch or may be designed with a detent so as not to fold without specific caregiver interaction as is known in the art.

Figure 14:
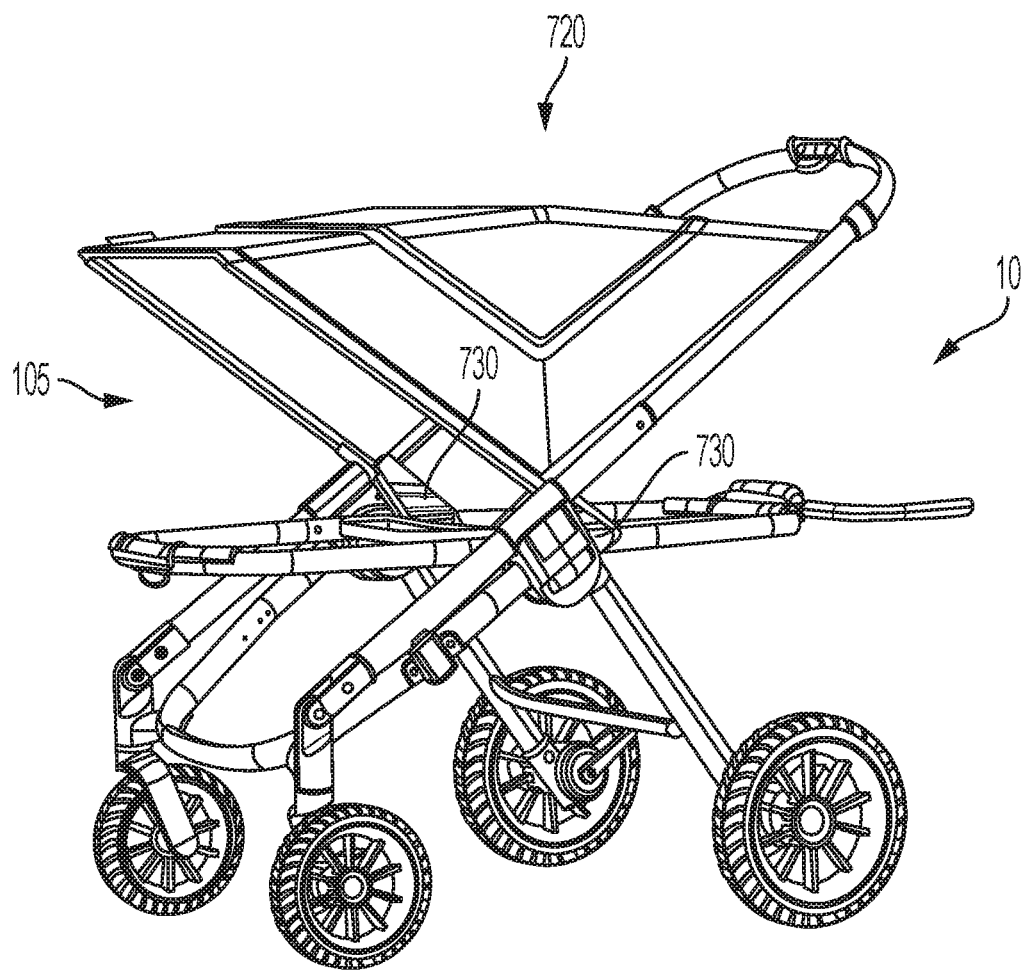
FIG. 14 is a side perspective view of the frame components only of the stroller of FIG. 1 showing an optional double canopy accessory.

As best shown in FIG. 14, a double canopy 720 accessory may be provided that covers a large extent of both the front and back portions of the wagon stroller 10. The double canopy 720 may be provided with clip-on connectors 730 for releasably attaching the double canopy 720 to the upper frame portion 110 of the stroller frame 105.

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A stroller convertible for multiple modes of operation comprised of:
    an upper frame portion for supporting a main storage area therefrom;
    a lower frame portion, said lower frame portion comprising a front leg portion for supporting a front wheel assembly and a rear leg portion for supporting a rear wheel assembly, wherein the upper frame portion and lower frame portion are attached to each other by central connectors;
    a handle pivotally attached to the front leg portion thereby capable of use in a high push configuration a low pull configuration;
    at least one central connector including a locking mechanism thereon for releasably locking the handle in the high push configuration.

2. The stroller of claim 1 wherein the handle includes at least one collar thereon, the collar including a notch therein for receiving a hook finger on a portion of a pivoting interlock.

3. The stroller of claim 1 wherein the front leg portion includes struts attached thereto for attaching pivotable wheels to the front leg portion.

4. The stroller of claim 3 wherein the handle bottom portions are pivotally attached to said struts.

5. The stroller of claim 1 wherein the upper frame portion includes a front portion that is pivotally attached to said central connectors and is adapted to pivot downwardly.

6. The stroller of claim 1 wherein the central connectors include hub portions attached thereto, the hub portions adapted to releasably attach a seating structure thereto.

7. The stroller of claim 1 having a double canopy releasably attached to the upper frame portion of the stroller.

8. The stroller of claim 1 wherein the upper frame portion includes a rear portion having a generally U-shaped support pivotally attached thereto for supporting an auxiliary storage compartment.

9. The stroller of claim 1 wherein the upper frame member is generally rectangular shaped.

10. The stroller of claim 1 wherein the lower frame member is generally v-shaped.

11. The stroller of claim 1 wherein the handle is generally u-shaped.

12. A stroller convertible for multiple modes of operation comprised of:
   a generally rectangular upper frame portion for supporting a main storage area therefrom;
   a generally v-shaped lower frame portion, said lower frame portion comprising a front leg portion for supporting a front wheel assembly and a rear leg portion for supporting a rear wheel assembly, wherein the upper frame portion and lower frame portion are attached to each other by central connectors;
   a generally u-shaped handle having bottom portions pivotally attached to the front leg portion thereby capable of use in a high push configuration a low pull configuration;
   at least one central connector including a locking mechanism thereon for releasably locking the handle in the high push configuration.

13. The stroller of claim 1 wherein the handle includes at least one collar thereon, the collar including a notch therein for receiving a hook finger on a portion of a pivoting interlock.

14. The stroller of claim 1 wherein the front leg portion includes struts attached thereto for attaching pivotable wheels to the front leg portion.

15. The stroller of claim 3 wherein the handle bottom portions are pivotally attached to said struts.

16. The stroller of claim 1 wherein the upper frame portion includes a front portion that is pivotally attached to said central connectors and is adapted to pivot downwardly.

17. The stroller of claim 1 wherein the central connectors include hub portions attached thereto, the hub portions adapted to releasably attach a seating structure thereto.

18. The stroller of claim 1 having a double canopy releasably attached to the upper frame portion of the stroller.

19. The stroller of claim 1 wherein the upper frame portion includes a rear portion having a generally u-shaped support pivotally attached thereto for supporting an auxiliary storage compartment.

20. A stroller convertible for multiple modes of operation comprised of:
   a generally rectangular upper frame portion for supporting a main storage area therefrom, the upper frame portion having a front portion and a rear portion;
   a generally v-shaped lower frame portion, said lower frame portion comprising a front leg portion for supporting a front wheel assembly and a rear leg portion for supporting a rear wheel assembly, wherein the upper frame portion and lower frame portion are attached to each other by central connectors;
   a generally u-shaped handle having bottom portions pivotally attached to the front leg portion thereby capable of use in a high push configuration a low pull configuration;
   at least one central connector including a locking mechanism thereon for releasably locking the handle in the high push configuration; the central connectors further including hub portions attached thereto, the hub portions adapted to releasably attach a seating structure thereto.

\* \* \* \* \*